United States Patent [19]

Ball

[11] 4,071,394
[45] Jan. 31, 1978

[54] APPARATUS FOR MANUFACTURING NON-WOVEN FABRIC TUBULAR FILTER

[75] Inventor: Harry Ball, Piscataway, N.J.

[73] Assignee: Olympic Engineering Co., Piscataway, N.J.

[21] Appl. No.: 779,235

[22] Filed: Mar. 18, 1977

[51] Int. Cl.² .................. B29D 23/10; D04H 18/00
[52] U.S. Cl. ............................. 156/465; 28/110; 156/148; 156/466
[58] Field of Search ............... 156/62.8, 148, 173, 156/175, 189, 203, 217, 218, 393, 431, 445, 465, 466; 428/36, 300; 28/4 R, 72.2 R

[56] References Cited
U.S. PATENT DOCUMENTS

| 3,192,598 | 7/1965 | Stevenson et al. | 28/72.2 R |
| 3,535,756 | 10/1970 | Kuts et al. | 28/72.2 R |
| 3,909,893 | 10/1975 | Wilde | 28/72.2 R |
| 3,952,121 | 4/1976 | Pilo | 156/148 |
| 3,999,929 | 12/1976 | Perusse | 156/466 |

Primary Examiner—Caleb Weston
Attorney, Agent, or Firm—Burgess, Ryan and Wayne

[57] ABSTRACT

A non-woven fabric web is converted to a tubular shape by forming the web between a cylindrical mandrel and surrounding sleeve, and passing reciprocating barbed needles through the region where the sides of the web abut each other, to form a butt joint thereat. The apparatus includes a pair of rollers for drawing the tubular shaped web between the mandrel and sleeve, as well as a motor and control circuit for operating the reciprocating needles.

5 Claims, 11 Drawing Figures

APPARATUS FOR MANUFACTURING NON-WOVEN FABRIC TUBULAR FILTER

BACKGROUND OF THE INVENTION

This invention relates to a method and apparatus for manufacturing a tubular filter from a non-woven fabric web, and the resulting product.

Filters having non-woven fabric structures are presently utilized for filtering materials such as paint and various chemicals. Such filters are especially useful for filtering enamels to remove gel particles or unmilled paint particles therefrom.

The term "non-woven fabric web" as herein employed is intended to mean a needled felt web formed of relatively short (up to several inches in length) mechanically interlocked fibers or strands having various relative orientations.

Commonly utilized filters of the aforementioned type comprise a cylindrical perforated core of resin impregnated paper wire mesh, or perforated steel upon which has been deposited a non-woven fabric web. A cylindrical wire tube or tubes to which a vacuum is applied, is immersed in a water slurry of fibers and water emulsified resins (as a binder). The wire tubes are slowly turned while in the slurry and a deposit of fiber and binder is formed. The formed fibrous cylinder is next transferred to an oven to drive off the water and cure the resin binder.

Disadvantages of the aforementioned prior art process and resulting filter are (i) a tremendous amount of water has to be driven off in the drying process so the resin can be cured, requiring a great deal of energy; (ii) the process is relatively "messy", and unsuitable for use in manufacturing small quantities of special purpose filters; and (iii) the fibers of the resulting filter are not randomly oriented, as may be desirable in certain applications, but due to the rotation of the fiberglass core are oriented in a generally annular direction.

In addition, special prior treatments to the felts such as singeing, glazing, calendaring, and fabric scrim reinforcement cannot be performed in conjunction with said prior art process.

Accordingly, an object of the present invention is to provide a tubular non-woven fabric filter which overcomes the aforementioned disadvantages, and a process and apparatus for manufacturing the same.

SUMMARY OF THE INVENTION

As herein described there is provided a process for manufacturing a tubular filter from a non-woven fabric web, comprising the steps of:

Providing a cylindrical mandrel, with a cylindrical guide sleeve coaxial with and surrounding at least a portion of the length of said mandrel; drawing said web onto said mandrel between said sleeve and said mandrel to form said web into a tubular shape with the sides of said web in abutting relationship; and transversely penetrating said abutting sides of said web with at least one reciprocating needle to provide sufficient penetrations per unit of length of said web to form a butt joint between said sides of said web to retain said web in said tubular shape.

According to a related aspect of the invention, there is also provided an apparatus for manufacturing a tubular filter from a non-woven fabric web, comprising a cylindrical mandrel; a guide sleeve coaxial with and surrounding at least a portion of the length of said mandrel; means for drawing said web onto said mandrel between said sleeve and said mandrel to form said web into a tubular shape with the sides of said web in abutting relationship; at least one needle having a plurality of barbed portions; means for holding said needle in a first needling position extending transversely of said mandrel and sleeve through the space therebetween; and means for transversely reciprocating said needle holding means.

The present invention also provides an improved tubular filter manufactured by the aforementioned process.

DETAILED DESCRIPTION

The invention will be more clearly understood by reference to the following detailed description taken in conjunction with the accompanying drawings, in which.

Figure 1:
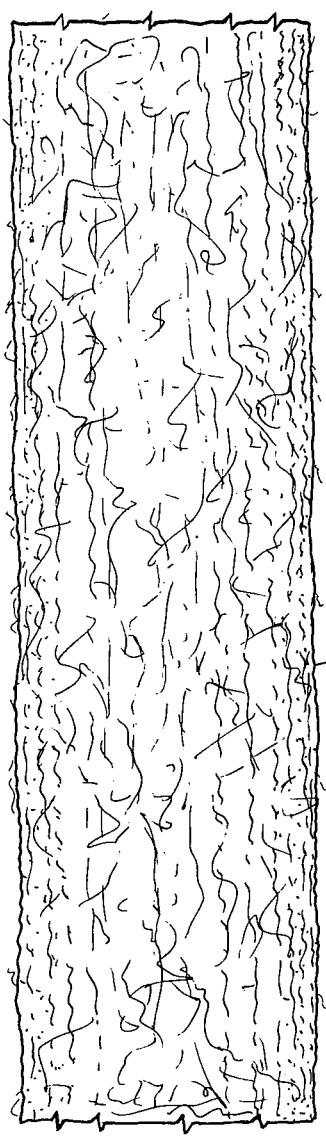
FIG. 1 is a plan view of a non-woven fabric web utilized in practicing the invention.
Figure 2:
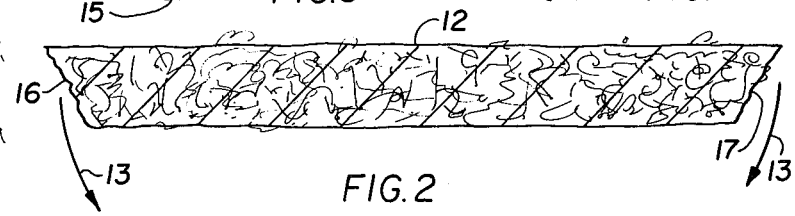
FIG. 2 is an end view of the web shown in FIG. 1.

The non-woven fabric web 12 as shown in FIGS. 1 and 2 comprises a multiplicity of randomly oriented individual fibers which are bonded together, either by means of a separate bonding agent or by fusing together the fibers. Preferably, in practicing the invention, the individual fibers of the web 12 are fused together to form the web structure, and are relatively coarse.

Preferably the fibers comprising the web 12 should have a coarseness of 15 denier or more. Fibers in the range of 25 to 40 denier are preferred for most applications. In the particular embodiment of the invention which was actually manufactured, it was found that 25 denier fibers with a staple or fiber length of the order of 3 inches gave good results.

Preferred materials for the non-woven web 12 are polyester fibers such as, but not limited to, rayon and dacron. In the aforementioned preferred embodiment, 25 denier dacron was employed.

If desired, the non-woven fabric web 12 may comprise two or more adjacent layers. These layers may be of the same denier, or alternatively may be of progressively finer denier, with the web being oriented so that when it is formed into a tubular shape the innermost layer has the finest denier (i.e.) in arrangements where the fluid to be filtered is introduced to the exterior surface of the resulting tubular filter). Such an arrangement provides a progressive filtering action, so that the coarsest particles are removed by the outer layer, and progressively finer particles are removed by the inner layers.

As shown in FIG. 2, it has been found that an improved filter structure results when the sides of the web 12 are chamfered so that the web surface which becomes the outer surface of the tubular filter has a width greater than that of the web surface which becomes the inner surface of the filter, when the web is bent in the direction of the arrows 13 to form said tubular structure. Preferably, the acute angle at which the sides of the web 12 are chamfered may be on the order of 30°.

Figure 3:
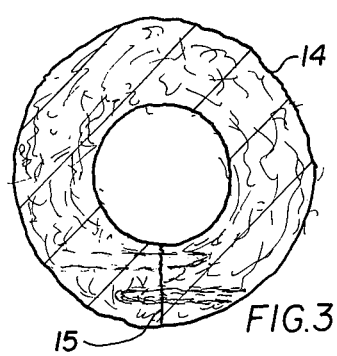
FIG. 3 is an end view of a tubular filter according to a first embodiment of the invention.

FIG. 3 shows a tubular filter produced according to the present invention, in which the web 12 has been formed into a tubular structure 14 having a butt joint 15 between the opposite sides 16 and 17 of the web 12. In the bulk of the tubular filter 14, the fibers comprising the same are randomly oriented, as of course are the fibers comprising the web 12 utilized in forming said tubular filter. However, in the vicinity of the butt joint 15, the random orientation of the fibers has been disturbed by a needling action produced by the apparatus hereafter described, so that the fibers on the side 16 of the web 12 have become intertwined with the fibers on the side 17 thereof, thus effectively bonding said sides together to form the butt joint 15.

Figure 4:
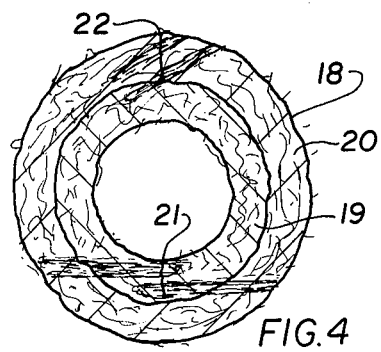
FIG. 4 is an end view of a tubular filter according to a second embodiment of the invention.

The tubular filter 18 shown in FIG. 4 comprises an inner layer 19 and an outer layer 20, said layers having respective butt joints 21 and 22. Each of the layers 19 and 20 comprises a non-woven fabric structure of the type previously described with respect to the web 12. Each of the butt joints 21 and 22 is similar in structure to the butt joint 15 of the tubular filter 14.

The two-layered tubular filter 18 is formed from a web 12 having two layers, which may preferably be of different denier as previously mentioned, i.e., with the layer 19 having the least denier, for greatest fineness. To make the tubular filter 18, a similar process to that employed in making the filter 14 is employed, except that in the case of the filter 18 the two layers 19 and 20 of the web utilized to form the filter 18 are separated and formed in such a manner that the butt joints 21 and 22 are disposed at different rotational positions (180° apart in FIG. 4) about the periphery of the tubular filter 18. This arrangement provides improved strength.

Typically, the web 12, and the resulting tubular filters 14 and 18, may have a thickness in the range of 0.25 to 1.0 inches.

Figure 5:
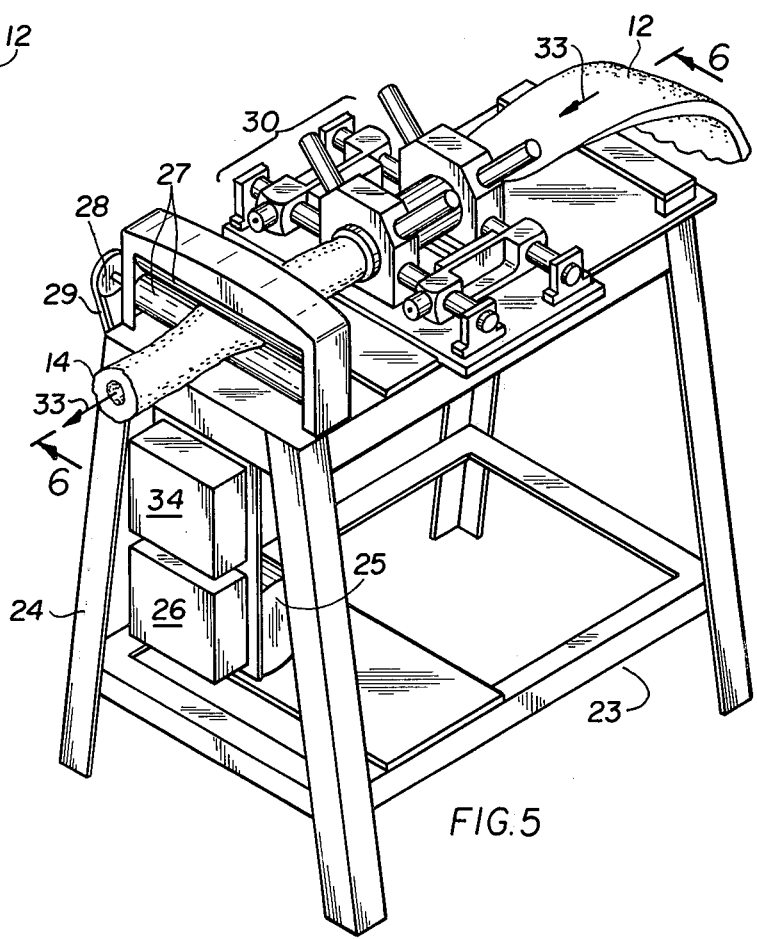
FIG. 5 is an isometric view showing apparatus employed in practicing the invention.
Figure 8:
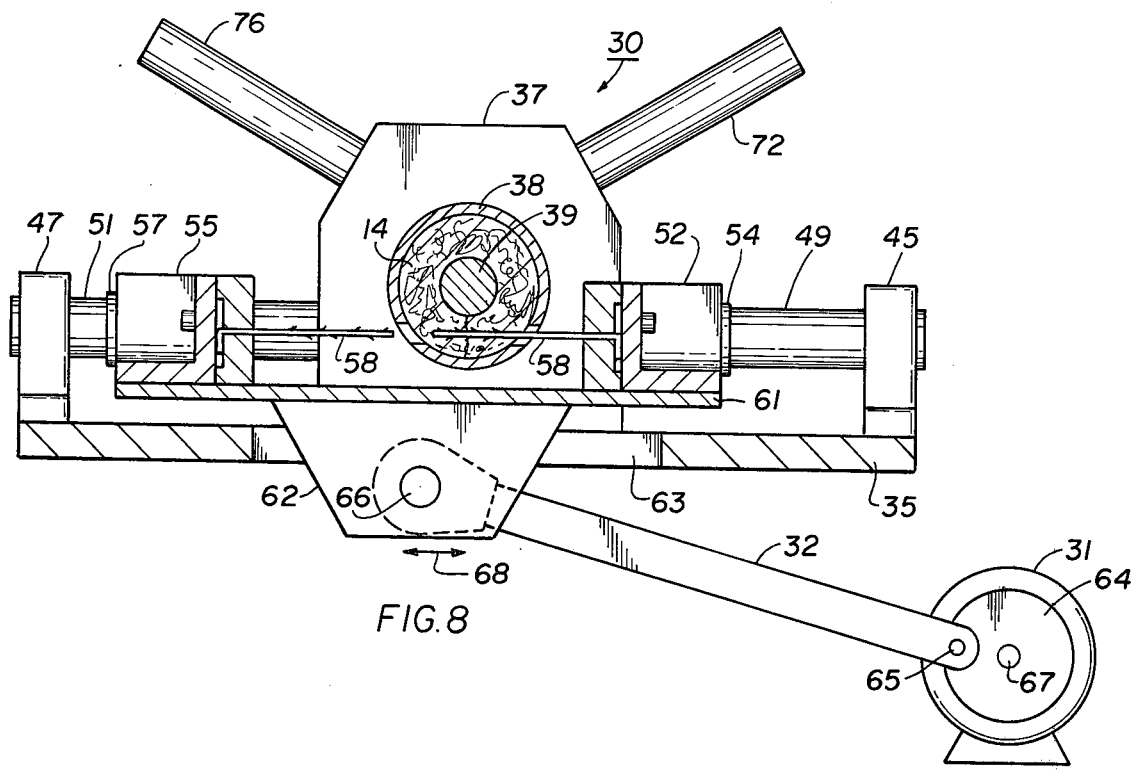
FIG. 8 shows a cross-sectional view of the apparatus of FIG. 7, taken along the cutting plane 8—8 therein as shown in FIGS. 6 and 7.

The apparatus 23 for manufacturing the tubular filters 14 and 18 from the web 12 is shown in FIG. 5, and comprises (i) a support structure 24, (ii) a drive motor 25, (iii) a drive motor control unit 26, (iv) a pair of rollers 27 driven by the motor 25 through a pulley 28 and a belt 29, (v) a tube shaping and needling unit 30, (vi) a needle reciprocating motor 31, (see FIGS. 6, 8 and 10), and (vii) a linkage 32 coupling the needle reciprocating motor 31 to the forming and needling device 30.

Referring again to FIG. 5, a web 12 having a width substantially equal to the circumference of the tube 14 to be formed therefrom, is initially fed by hand through the forming and needling device 30 and between the rollers 27 in the direction of the arrows 33. This initial hand feeding step is readily accomplished by cutting the lead end of the web 12 so as to form a relatively narrow strip therefrom, and feeding this narrow strip through the device 30 and between the rollers 27.

Once the initial feeding step is completed, the rollers 27 are driven by the motor 25 at a speed determined by the control unit 26 to draw the web 12 through the forming and needling unit 30.

As the web 12 is drawn through the forming and needling unit 30, it is shaped into a tubular form and the then abutting sides 16 and 17 thereof are needled together by the device 30 to form the butt joint 15. The amplitude of the strokes of the needles of the forming and needling device 30 is determined by the mechanical linkage between said device and the needle drive motor 31, and the rate at which the needles reciprocate is determined by the control unit 34, which controls the speed of the motor 31.

Figure 7:
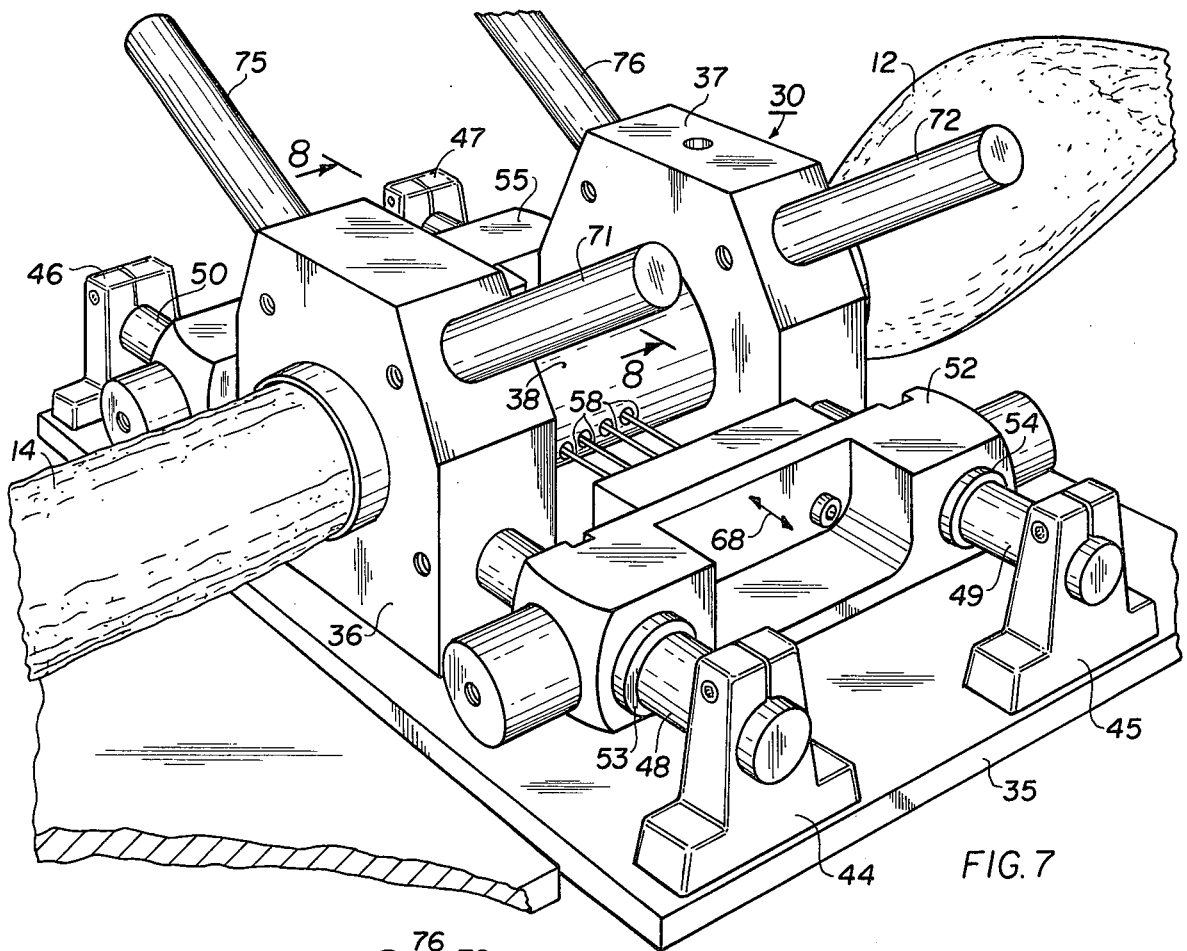
FIG. 7 shows an isometric view of the portion of the apparatus of FIG. 5 which performs the tube forming and needling operation of the process of the invention.

As shown more clearly in FIG. 7, the forming and needling device 30 comprises a base plate 35, two blocks 36 and 37 axially displaced from each other and having aligned holes therein, and a cylindrical shaping sleeve 38 disposed within and extending between said holes and having its outer periphery thereof secured to said blocks.

Figure 6:
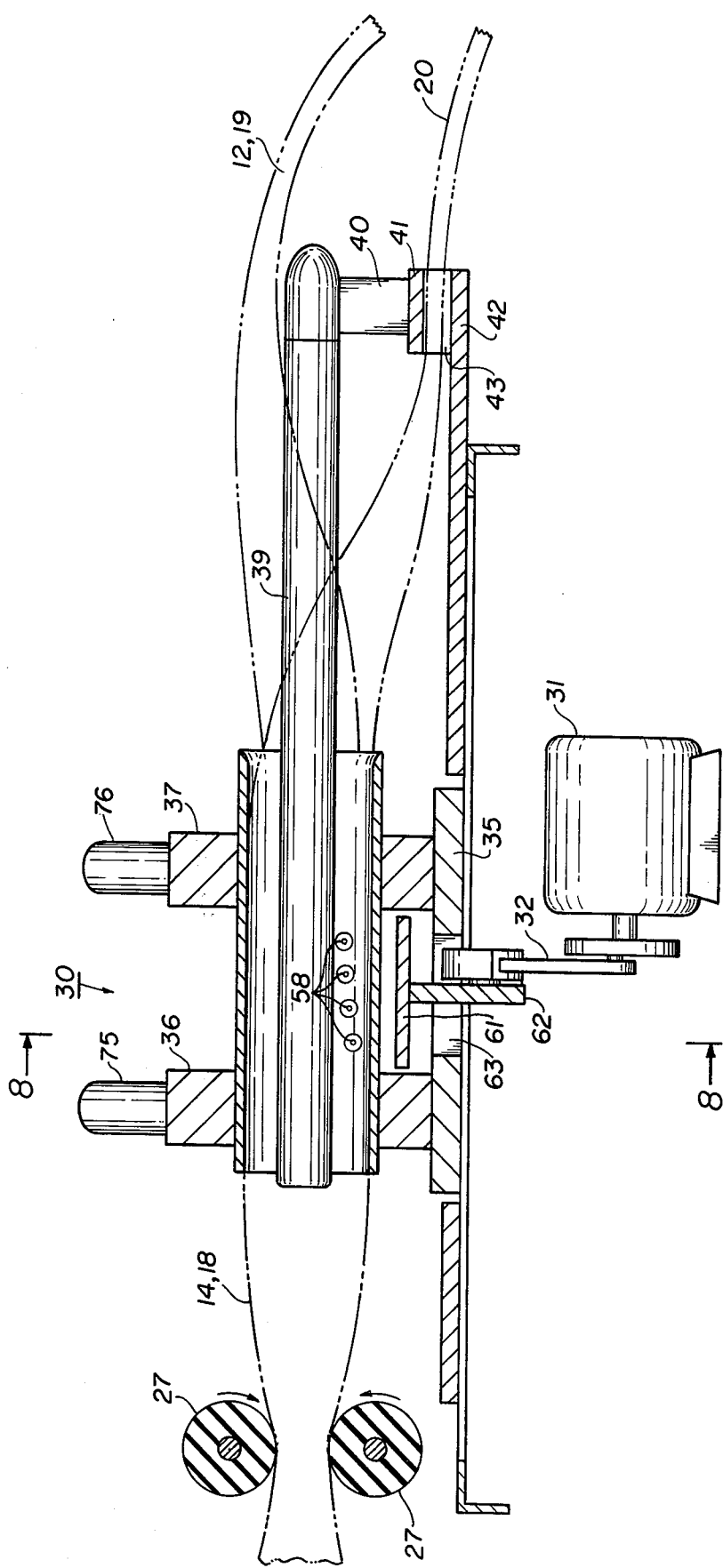
FIG. 6 is a cross-sectional view of part of the apparatus shown in FIG. 5, taken in the direction 6—6.

As more clearly shown in FIG. 6, a cylindrical mandrel 39 is secured to a vertical support 40 and cantilevered therefrom to extend coaxially through the sleeve 38. The support 40, in turn, is secured to a horizontal member 41 which is disposed above a support plate 42. Blocks 43 maintain the desired separation between the members 41 and 42.

Also disposed on the plate 35 are four rod support blocks 44, 45, 46 and 47. Support rods 48, 49, 50 and 51 extend from respective ones of these support blocks to corresponding support holes in the blocks 36 and 37. That is, the rod 48 extends between the block 36 and support 44; rod 49 extends between block 37 and support 45; rod 50 extends between block 36 and support 46; and rod 51 extends between block 37 and support 47.

A first needle holder 52 is slidably mounted on the rods 48 and 49 by means of journaled bearings 53 and 54 respectively. Similarly, a second needle holder 55 is slidably mounted to rods 50 and 51 by journaled bearings 56 and 57 respectively.

Figure 11:
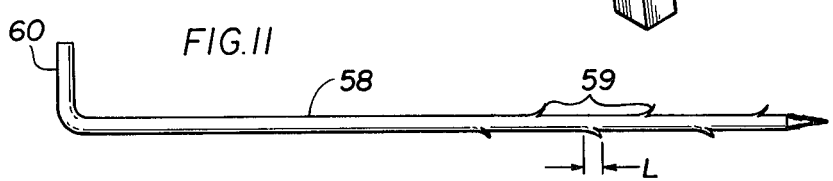
FIG. 11 is a side view of one of the barbed needles employed in the aforementioned apparatus.

Extending transversely of the mandrel 39 and sleeve 38 through corresponding holes in said sleeve are a plurality of needles 58, each having a structure as shown in FIG. 11. Each of the needles 58 has a plurality of barbed portions 59 thereon, each of said barbed portions 59 having a length L which may typically be on the order of 0.25 inch. Each of the needles 58 has a bent end part 60 which may be inserted in a corresponding hole or slot of one of the holders 52 and 55 and secured therein with a set screw or other locking device to secure said needle in position.

As shown in FIG. 7, four of the needles 58 extend from the holder 52 through holes in the sleeve 38 into the space between said sleeve and the mandrel 39. Although not visible in FIG. 7, in similar fashion, four additional needles 58 extend from the holder 55 through corresponding holes in the sleeve 38, into said space between said mandrel and sleeve. The needles extending from the holder 52 alternate in staggered fashion with the needles extending from the holder 55.

A drive plate 61 (see FIGS. 6 and 8) is disposed above the plate 35 and between the blocks 36 and 37. The drive plate 61 is secured to the bottom surfaces of the needle holders 52 and 55. A bracket 62 is secured to the bottom surface of the drive plate 61 and extends downwardly through a hole 63 in the plate 35.

One end of the link 32 is pivotally secured to a disk 64 by means of a pivot pin 65. The other end of the link 32 is pivotally secured to the bracket 62 by means of a pivot pin 66. The disk 64 is secured to the shaft 67 of the motor 31 for rotation therewith.

The above described connection between the bracket 62 and the shaft 67 of the motor 31 results in reciprocating movement in the direction indicated by the arrows 68, i.e., along the direction of the rods 48, 49, 50 and 51 or transversely of the mandrel 39 and sleeve 38, of the drive plate 61, needle holders 52 and 55, and needles 58 secured thereto when the motor 31 is operated to cause rotation of its shaft 67. The amplitude of this reciprocating movement is determined by the distance between the shaft 67 and pin 65, and the angle between the link 32 and bracket 62.

Preferably, the amplitude of reciprocation of the holders 52 and 55 and needles 58 mounted thereon, should be at least equal to 2L, i.e., twice the length of one of the barbed portions 59 of the needles 58. In practice, good results have been achieved with reciprocation amplitudes on the order of 2 to 3 times the length of said barbed portions. For example, utilizing needles 58 having barbed portions approximately 0.25 inch in length, good results have been realized with reciprocation amplitudes in the range of 0.50 to 0.75 inch.

While the rate of reciprocation of the holders 52 and 55 and associated needles 58 is not critical, this rate should be sufficiently high so that a desired number of needle penetrations of the web being processed can be achieved per unit length, with an acceptable rate of linear feed of the web material. However, if the reciprocation rate is excessively high, an unacceptable degree of breakage of the fibers results, so that the butt joint formed thereby is relatively weak.

Preferably, the web 12 should be fed through the space between the mandrel 39 and sleeve 38 in such a manner, and with such a reciprocation speed of the drive plate 61, so that the number of needle penetrations of said web is in the range of 200 to 800 penetrations per linear inch of web length. Optimum results have been achieved with said number of penetrations being on the order of 450 per unit length.

Figure 9:
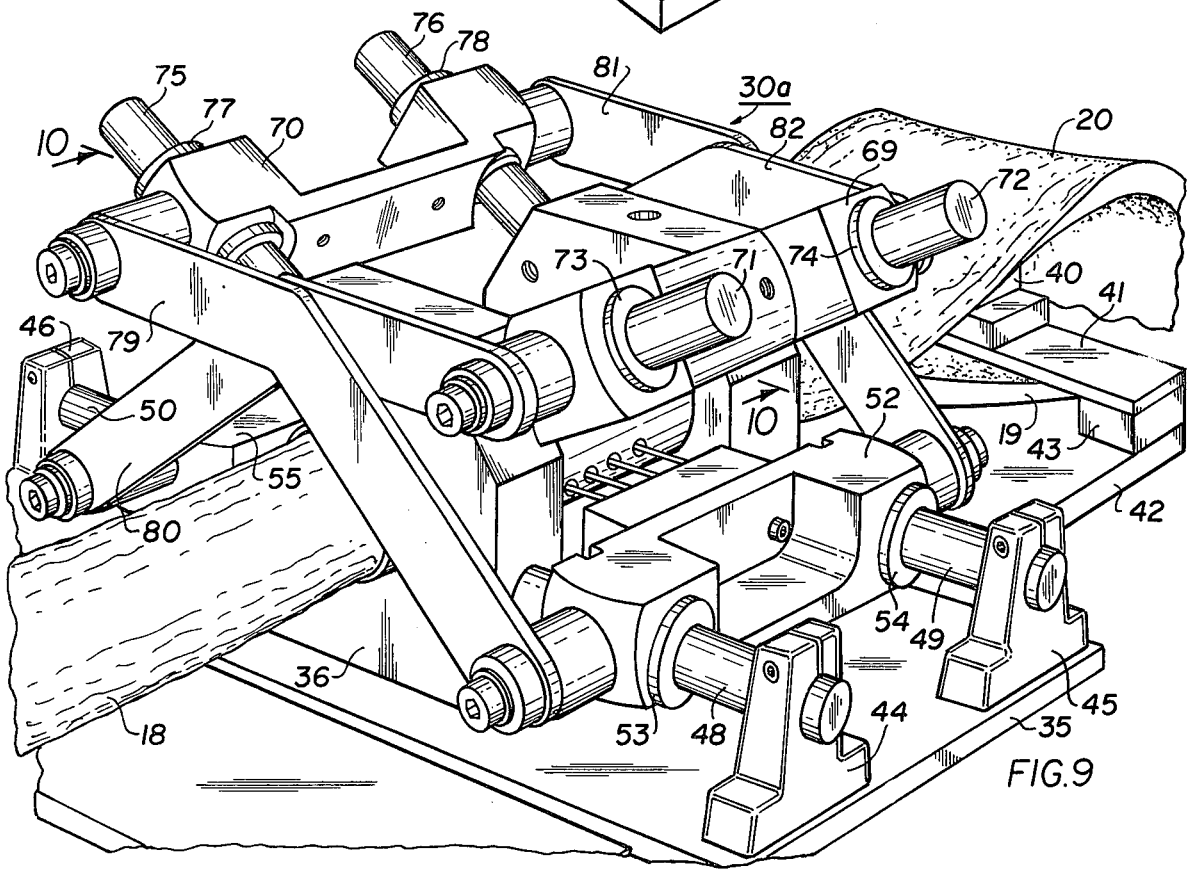
FIG. 9 shows the apparatus of FIG. 7, modified to manufacture tubular filters according to the second embodiment of the invention.
Figure 10:
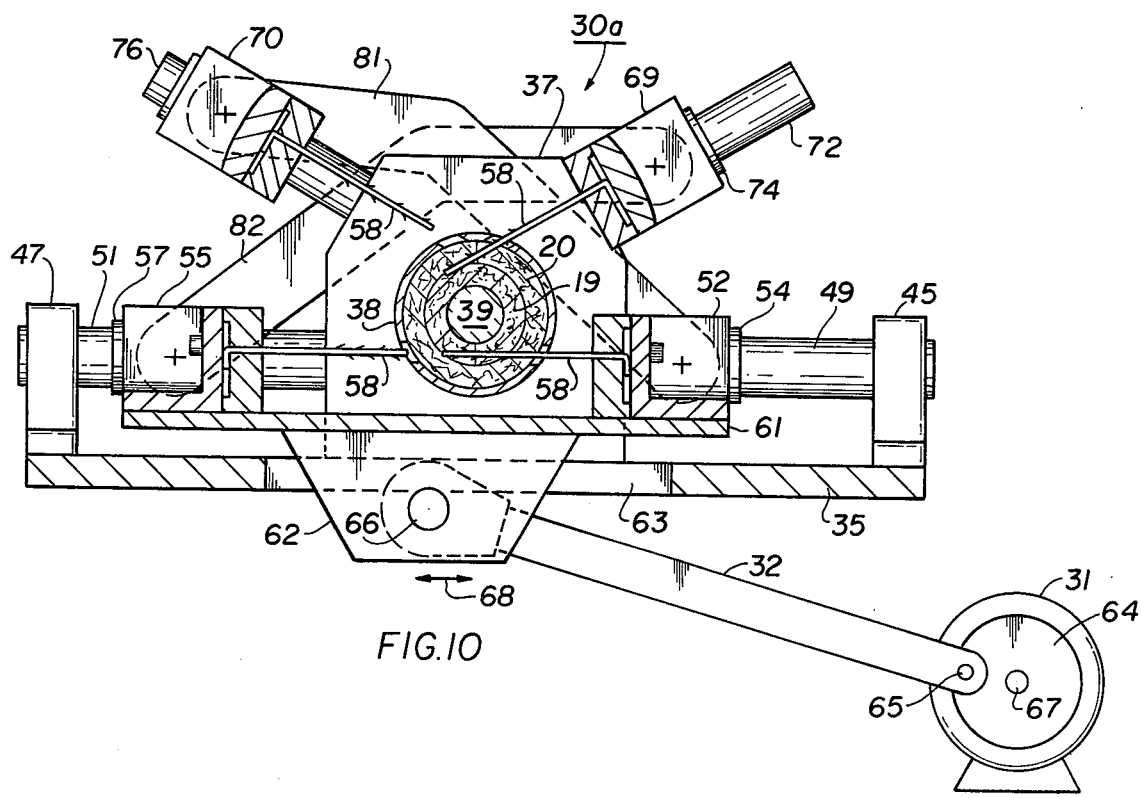
FIG. 10 shows a cross-sectional view of the apparatus of FIG. 9 taken along the cutting plane 10 (similar to 8—8 of FIG. 6) therein.

The modified version of the forming and needling unit 30 required to manufacture a filter of the type 18 shown in FIG. 4, is shown as 30a in FIGS. 9 and 10. This modified unit is identical to the unit 30, except that a first additional needle holder 69 and a second additional needle holder 70 are provided to produce the desired needling action on the additional butt joint of the filter 18. Each of the holders 69 and 70 has a corresponding plurality (4 in the preferred embodiment) of the needles 58 extending therefrom. The holder 69 is slidably mounted on support rods 71 and 72 extending diagonally upward from the blocks 36 and 37 respectively, by means of respective journaled bearings 73 and 74. Similarly, the holder 70 is slidably mounted on support rods 75 and 76 extending diagonally upward from the blocks 36 and 37 respectively, by means of respective journaled bearings 77 and 78.

Reciprocating movement of the holders 69 and 70 in synchronism with movement of the holders 52 and 55 is provided by the connecting links 79, 80, 81 and 82. The links 79 and 81 connect the holders 70 and 52 together, for coordinated sliding movement, while the links 80 and 82 connect the holders 69 and 55 together for coordinated movement. That is, when the drive plate 61 moves to the right, the holders 52 and 55 also move to the right, causing the holder 70 to move diagonally down toward the right and the holder 69 to move diagonally up toward the right. The net effect of these movements is to cause the needles secured to the holders 52 and 69 to partially withdraw from the interior space between the mandrel 39 and sleeve 38, while at the same time causing the holders 55 and 70 to extend further into said interior space. When the drive plate 61 is reciprocated in the opposite direction, i.e., toward the left, as seen for example in FIG. 7, opposite movements of said holders and their associated needles occur.

The manner in which the apparatus described above operates in accordance with the invention will best be understood by reference to FIGS. 6 through 10.

As shown in FIG. 6, the web 12 is fed over the mandrel 39 and is drawn into the space between the mandrel 39 and sleeve 38 by the drive action of the rollers 27. The web 12 is initially oriented so that as it is formed into a tubular shape by the action of the mandrel 39 and cooperating sleeve 38, the butt joint formed between the sides of the web is centrally situated below the mandrel 39. It has been found that once the feeding process is started, there is no appreciable rotation of the web, i.e., the butt joint remains situated centrally below the mandrel 39.

As the web 12 is drawn through the space between the mandrel 39 and sleeve 38, the needles 58 of the holders 52 and 55 move in reciprocating fashion through the region of the butt joint between the sides of the web to cause movement of the web fibers in the vicinity of said joint, thereby securing the sides 16 and 17 of the web 12 together at said joint, thus retaining the web 12 in tubular shape 14 as shown in FIG. 3.

As is evident in FIG. 6, preferably the needles 58 are situated at different distances from the mandrel 39, so as to provide the desired needling action throughout the cross section of the butt joint 15 (see FIG. 3) formed by said needling action.

If desired, after the tubular filter 14 is formed, it may be impregnated with a bonding agent such as a thermoplastic resin, in known fashion, for additional structural strength and stability.

When it is desired to form the two-layered tubular filter 18, the modified forming and needling unit 30a shown in FIGS. 9 and 10 is employed. As indicated in FIG. 6, the layers 19 and 20 of the web being fed into the unit 30a are separated, with the web layer 20 being fed between the plates 41 and 42 toward the bottom portion of the mandrel 39, and the layer 19 being fed toward the upper portion of the mandrel 39. The action between these layers and the mandrel 39 and sleeve 38 results in the inner layer 19 being shaped into a tubular form with the sides thereof in abutment below the center line of the mandrel 39, and formation of the outer layer 20 into a tubular shape with the sides thereof in abutment above the center line of the mandrel 39. That is, the layers 19 and 20 are formed into contiguous tubular shapes with their sides in abutment at regions rotationally displaced 180° from each other.

As is evident from FIG. 10, as the layers 19 and 20 are drawn through the forming and needling device 30a by the rollers 27, the needles 58 secured to the lower holders 52 and 55 provide a needling action through the abutting sides of the inner layer 19 to form the butt joint 21 (see FIG. 4). At the same time, the needling action of the needles 58 of the upper holders 69 and 70 causes said needles to extend through the abutting sides of the outer layer 20 to form the butt joint 22 (see FIG. 4).

In similar fashion, additional reciprocating needle holders and associated needles could be provided to form a plurality of butt joints in a plurality of layers of a web, i.e., the two layered structure 18 shown in FIG. 4 could be extended to a structure having additional layers.

As previously pointed out, the resulting tubular filter structure is different from prior art structures, in that the fibers thereof have a random orientation which is disturbed only in the region of the aforementioned butt joint(s). It is possible that there are other differences between the resulting structure and that produced by prior art devices. However, such differences are difficult to define except by defining Applicants structure in terms of that which results by carrying out the process described above.

In cases where the fluid to be filtered is introduced into the interior rather than the exterior of a multi-layered filter having layers of different coarseness, the coarsest layer should of course be the innermost layer and the finest layer should be the outermost layer.

By the term "barbed needle" as employed herein is meant any needle having lateral protuberances which is capable of effecting an intertwining of the web fibers to form a butt joint as previously described.

What is claimed is:

1. Apparatus for manufacturing a tubular filter from a non-woven fabric web, comprising:

a cylindrical mandrel;

a guide sleeve coaxial with and surrounding at least a portion of the length of said mandrel;

means for drawing said web onto said mandrel between said sleeve and said mandrel to form said web into a tubular shape with the sides of said web in abutting relationship;

at least one needle having a plurality of barbed portions;

means for holding said needle in a first needling position extending transversely of said mandrel and sleeve through the space therebetween; and means for transversely reciprocating said needle holding means.

2. The apparatus according to claim 1, further comprising a plurality of said needles disposed at different distances from the axis of said mandrel.

3. The apparatus according to claim 2, further comprising additional needle holding means for holding at least one other needle in a second needling position extending transversely of said mandrel and sleeve through the space therebetween, said second needling position being rotationally displaced about said mandrel from said first needling position, and means for reciprocating said additional needle holding means.

4. The apparatus according to claim 2, wherein said needles are displaced from each other along the axial direction of said sleeve and mandrel.

5. The apparatus according to claim 4, wherein said reciprocating means reciprocates said needle holding means with an amplitude at least equal to twice the length of one of said barbed portions.

* * * * *